(12) United States Patent
 Zhang

(10) Patent No.: US 10,894,729 B2
(45) Date of Patent: Jan. 19, 2021

(54) METHOD AND APPARATUS FOR TREATING POLLUTED AND MALODOROUS RIVER

(71) Applicants: MISSISSIPPI INTERNATIONAL WATER INC., New York, NY (US); AMAZON WATER INC., George Town (KY); Dawei Zhang, Shenyang (CN)

(72) Inventor: Dawei Zhang, Shenyang (CN)

(73) Assignees: MISSISSIPPI INTERNATIONAL WATER INC., New York, NY (US); AMAZON WATER INC., George Town (KY)

( * ) Notice: Subject to any disclaimer, the term of this patent is extended or adjusted under 35 U.S.C. 154(b) by 183 days.

(21) Appl. No.: 16/095,553

(22) PCT Filed: Apr. 20, 2017

(86) PCT No.: PCT/CN2017/081242
§ 371 (c)(1),
(2) Date: Oct. 22, 2018

(87) PCT Pub. No.: WO2017/181964
PCT Pub. Date: Oct. 26, 2017

(65) Prior Publication Data
US 2019/0127245 A1 May 2, 2019

(30) Foreign Application Priority Data
Apr. 22, 2016 (CN) .......................... 2016 1 0255147

(51) Int. Cl.
*C02F 11/12* (2019.01)
*C02F 1/52* (2006.01)
(Continued)

(52) U.S. Cl.
CPC .............. *C02F 1/5209* (2013.01); *C02F 9/00* (2013.01); *C02F 11/12* (2013.01); *C02F 1/283* (2013.01);
(Continued)

(58) Field of Classification Search
None
See application file for complete search history.

(56) References Cited

U.S. PATENT DOCUMENTS

2012/0237994 A1\* 9/2012 Das ........................ C12N 11/14
 435/167
2015/0291264 A1\* 10/2015 Kryzak ..................... B09C 1/08
 210/747.5

FOREIGN PATENT DOCUMENTS

CN 101274811 A 10/2008
CN 102020403 A 4/2011
(Continued)

OTHER PUBLICATIONS

International Search Report and Written Opinon issued in corresponding International Application No. PCT/CN2017/081242 dated Jul. 28, 2017, and English translation thereof (16 pages).

*Primary Examiner* — Chester T Barry
(74) *Attorney, Agent, or Firm* — Osha Bergman Watanabe & Burton LLP

(57) ABSTRACT

This disclosure discloses an apparatus of treating a river, comprising a river bed sludge suction device, a container-type sand-stone refuse separation device, a container-type dehydration device, a container-type pulverization device, a storage container, a container-type drying device, a container-type carbonization device, a container-type flocculation device, a container-type precipitation device, a container-type activated coke filtration and adsorption device, a container-type power generation device, a container-type operation and control chamber, and a cleaning ship for
(Continued)

floating debris and river bank refuse. This disclosure discloses a method of treating a river using the apparatus described above where a biochar is produced from the separated, dehydrated and dried sludge. The biochar is then delivered back to the river bed to adsorb nitrogen and phosphorus, cleaning the river water, followed by purification treatments on sewage discharged from the dehydration apparatus and discharging the treated sewage water back to the river.

10 Claims, 4 Drawing Sheets

(51) Int. Cl.
*C02F 9/00* (2006.01)
*C02F 101/10* (2006.01)
*C02F 101/16* (2006.01)
*C02F 1/28* (2006.01)

(52) U.S. Cl.
CPC .......... *C02F 1/52* (2013.01); *C02F 2101/105* (2013.01); *C02F 2101/16* (2013.01); *C02F 2201/002* (2013.01); *C02F 2303/02* (2013.01); *C02F 2303/06* (2013.01)

(56) References Cited

FOREIGN PATENT DOCUMENTS

| | | |
|---|---|---|
| CN | 102443404 B | 11/2013 |
| CN | 101624256 B | 12/2013 |
| CN | 103601352 A | 2/2014 |
| CN | 105858953 A | 8/2016 |
| CN | 205917090 U | 2/2017 |
| EP | 2492403 A2 | 8/2012 |
| KR | 20080042268 A | 5/2008 |

* cited by examiner

METHOD AND APPARATUS FOR TREATING POLLUTED AND MALODOROUS RIVER

TECHNICAL FIELD

This disclosure belongs to the technical field of sewage water treatment, and particularly to a method of treating a polluted and malodorous river.

This disclosure also relates to an apparatus for implementing the method described above.

BACKGROUND ART

At present, most of urban river channels in China have become polluted and malodorous river channels. In many cities in China, organic pollution of river channels is ubiquitous and increasingly notable. Urban sewage water is directly discharged to river channels and river segments flowing through towns are severely polluted, and the water therein looks black and produces malodorous seasonally or perennially. All of these become problems of the water environment urgent to be solved in problems of urban river channel pollution.

River water pollution is mainly for the following reasons.

1) As the economy develops and town populations continuously increase around rivers, water for production and living also greatly increases and the bearing capacity and the self-cleaning capacity for organic matter discharged to rivers decrease.

2) A large amount of untreated waste water and sewage water from industrial companies, breeding companies, and city living is discharged to rivers, leading to pollution and eutrophication of river water. Aquatic plants in river water excessively grow, leading to the decrease in the oxygen content in water and corruption and deterioration of water.

3) The flowability of river water is bad, nutrients in water are enriched, and the oxygen content in water is consumed by nutrients in water and becomes lower rather than increased. The decrease in the oxygen content in turn promotes the increase in anaerobic organisms in water. Under the combined action of these factors, water is eutrophicated and finally becomes a pool of stagnant water.

4) Organic pollutants contained in waste water and sewage water discharged to rivers is deposited for a long period to form sludge at the bottom of rivers. When hot weather and long-time irradiation of sunlight occur in summer and the temperature of water increases, river bed sludge is decomposed to release large amounts of eutrophication matters such as ammonic nitrogen, and the like, so that various organic matter such as microorganisms, algae, and the like in river water propagate massively and the quality of river water deteriorates rapidly. This results in sudden water pollution, which severely influences production of companies and living of urban inhabitants around rivers.

Conventional treatments of river water pollution usually employ water transfer and drainage, mechanical dragging, waterweed planting, fish farming, microorganism input, and the like. In the application process of the methods described above, there are defects of non-significant effects, high treatment cost, non-thorough treatment, and the like.

SUMMARY OF THE INVENTION

An object of this disclosure is to provide a method of treating a polluted and malodorous river.

Another object of this disclosure is to provide an apparatus for implementing the method described above.

In order to achieve the object described above, the method of treating a polluted and malodorous river provided in this disclosure mainly comprises:

1) withdrawing a sludge in river bed from a polluted and malodorous river to be treated, and performing treatments of separation, dehydration, and drying on the sludge with a sand-stone refuse separation apparatus, a dehydration apparatus, and a drying apparatus;

2) producing biochar from the separated, dehydrated, and dried sludge;

3) pulverizing floating debris or/and river bank refuse from the river, performing treatments of dehydration and drying on the pulverized floating debris or/and river bank refuse, and then producing biochar from the floating debris or/and river bank refuse;

4) delivering the biochar produced in steps 2) and 3) back to the river bed to adsorb ammonic nitrogen and phosphorus generated by degradation of organic matter in the river bed, thereby cleaning river water;

5) performing purification treatments of flocculation, precipitation, and activated coke filtration and adsorption on sewage water discharged from the dehydration apparatus in step 2) and 3), and discharging the treated sewage water back to the river; and 6) performing circular purification treatments on the polluted and malodorous river by withdrawing water from one end of a river segment to be treated with a water pump, sequentially passing the water into a container-type flocculation apparatus, a container-type precipitation apparatus, and a container-type activated coke filtration and adsorption apparatus for performing purification treatments of flocculation, precipitation, and activated coke filtration and adsorption, and discharging the treated water back into the river at the other end of the river segment to be treated after it reaches a water quality standard for river water specified by a local government, and finally overall recovering the water quality of the treated river segment to the river water quality standard specified by the local government.

In the method described, step 1 is withdrawing the sludge in the river bed from a river segment to be treated, and decreasing a water content rate of sludge from ≤95% to ≤40% by separation, dehydration, and drying procedures.

In the method described, step 2 and step 3 are producing biochar by using a carbonization method.

In the method described, step 5 is performing purification treatments of flocculation, precipitation, and activated coke filtration and adsorption on sewage water discharged from the dehydration apparatus, and then discharging the purified sewage water back to the river.

In the method described, step 6 is performing purification treatments of flocculation, precipitation, and activated coke filtration and adsorption on polluted and malodorous river water, and then discharging the treated polluted and malodorous river water back to the other end of the river segment to be treated after it reaches a water quality standard for river water specified by a local government, thereby performing circular purification treatments.

In the apparatus for implementing the method described above provided by this disclosure:

a sludge suction device, a container-type sand-stone refuse separation device, a container-type dehydration device, a container-type pulverization device, a container-type drying device, a container-type carbonization device, a container-type flocculation device, a container-type precipitation device, a container-type activated coke filtration and adsorption device, a container-type power generation device, and a container-type operation and control chamber are conveyed to an on-site field;

a water surface operation platform in the sludge suction device is placed into a river and a pneumatic pump is mounted onto the water surface operation platform, the sludge suction device is connected to the container-type sand-stone refuse separation device via a sludge delivery pipe laid on a water surface, large-size matters discharged from the container-type sand-stone refuse separation device is delivered to the container-type pulverization device for pulverization and then passed into the container-type dehydration device for dehydration, sludge treated by the container-type sand-stone refuse separation device is passed into the container-type dehydration device, sewage water dehydrated by the container-type dehydration device is sequentially passed into the container-type flocculation device, the container-type precipitation device, and the container-type activated coke filtration and adsorption device for performing purification treatments of flocculation, precipitation, and activated coke filtration and adsorption, and the resulted water satisfying the water quality standard is discharged back to the river, the sludge dehydrated by the container-type dehydration device is passed into the container-type drying device for treatment, the residue treated by the container-type drying device is delivered to the container-type carbonization device for producing biochar;

floating debris and river bank refuse collected by a cleaning ship are delivered to the container-type pulverization device for pulverization and then passed into the container-type dehydration device for dehydration, the residue after dehydration was passed into the container-type drying device for treatment, the residue treated by the container-type drying device is delivered to the container-type carbonization device for producing biochar, and the sewage water is sequentially passed into the container-type flocculation device, the container-type precipitation device, and the container-type activated coke filtration and adsorption device for performing purification treatments of flocculation, precipitation, and activated coke filtration and adsorption and then discharged back to the river;

withdrawing water from one end of a river to be treated with a water pump, sequentially passing the water into the container-type flocculation device, the container-type precipitation device, and the container-type activated coke filtration and adsorption device for performing purification treatments of flocculation, precipitation, and activated coke filtration and adsorption, and discharging the treated water back into the river at the other end of the treated river segment after the treated water satisfies a water quality standard for river water specified by a local government.

the biochar is delivered back to the river bed via a delivery pipeline;

operations of the various devices described above are controlled by the container-type operation and control chamber.

In the apparatus described, delivery facilities and a storage container are provided among the container-type sand-stone refuse separation device, the container-type dehydration device, the container-type drying device, and the container-type carbonization device.

In the apparatus described, the storage container is an open-top container and the storage container is divided into a plurality of storage units, and the lower part of each storage unit is a unit conical body, a unit output port is provided in the lower part of the unit conical body, and a belt conveyor is mounted in the lower part of each unit output port.

In the apparatus described, a container body is provided in the container-type activated coke filtration and adsorption device, a plurality of discharging ports, water outlet pipes, and water inlet pipes are provided on a side surface of the container body, a plurality of charging ports are provided on the top of the container body, lifting holes are provided at four top corners of the container body of the container body, locking holes are provided at four bottom corners of the container body, and an activated coke filtration and adsorption material is filled with the container body.

In the apparatus described, power of the various devices is supplied by the container-type power generation device, the container-type power generation device being composed of two parts, i.e. a container and a diesel power generation facility, and the diesel power generation facility is mounted within the container.

In the apparatus described, the container-type operation and control chamber is composed of two parts, i.e. a container and an electrical control facility, and the electrical control facility is mounted in the container.

Figure 1:
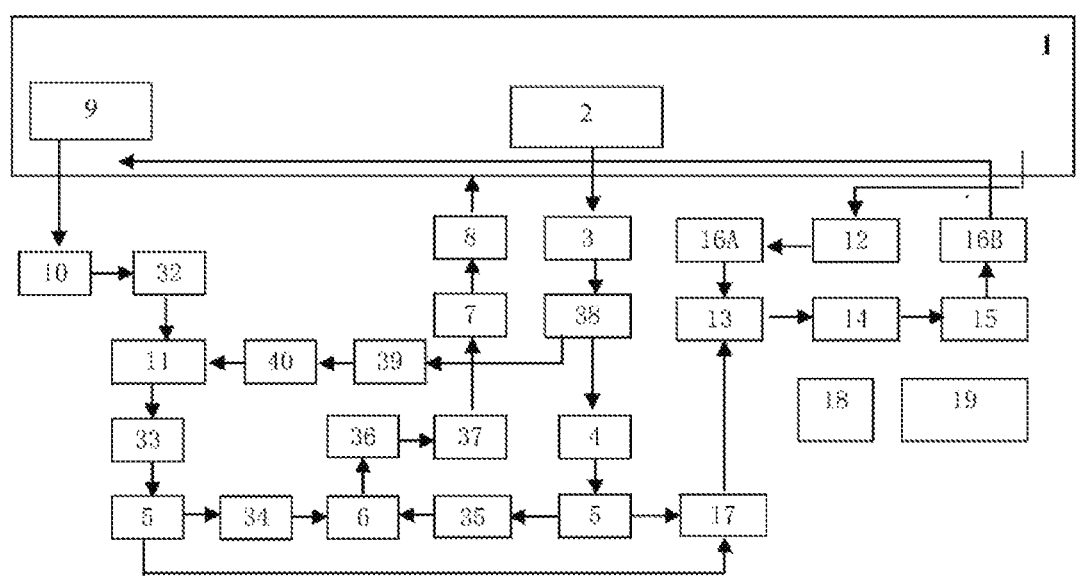
FIG. 1 is a schematic flow chart of pollution treatment of a polluted and malodorous river.

Description of reference numerals in accompanying drawings:

1. a segment of polluted and malodorous river to be treated, 2. a sludge suction device, 3. a sludge delivery pipeline, 4. sludge, 5. a container-type dehydration device, 6. a storage container, 7. a container-type carbonization device, 8. a biochar, 9. a cleaning ship, 10. floating debris and river bank refuse, 11. a container-type pulverization device, 12. a water pump, 13. a container-type flocculation device, 14. a container-type precipitation device, 15. a container-type activated coke filtration and adsorption device, 16A, 16B. delivery pipelines, 17. sewage water, 18. a container-type power generation device, 19. a container-type operation and control chamber, 20. a storage unit, 21. a unit conical body, 22. a unit output port, 23. a belt conveyor, 24. a container body, 25. a discharging port, 26. a charging port, 27. a lifting hole, 28. a locking hole, 29. a water outlet pipe, 30. a water inlet pipe, 32. a delivery facility A, 33. a delivery facility B, 34. a delivery facility C, 35. a delivery facility D, 36. a delivery facility E, 37. a container-type drying device, 38. a container-type sand-stone refuse separation device, 39. large-size matters, 40. a delivery facility F.

DESCRIPTION OF EMBODIMENTS

In order to enable objects, technical solutions, and advantages of this disclosure to be more obvious and clear, this disclosure will be further illustrated in details in conjunction with specific embodiments and with reference to figures.

The method of this disclosure mainly comprises the steps of: cleaning of river bed sludge; dehydration of sludge, clearing away of floating debris and river bank refuse;

pulverization of the floating debris and river bank refuse; drying and carbonization of dehydrated sludge; drying and carbonization of dehydrated floating debris and river bank refuse; circular purification treatments of flocculation, precipitation, and filtration and adsorption of sewage water; circular purification treatments of flocculation, precipitation, and filtration and adsorption of river water; and the like.

In detail, the method of treating a polluted and malodorous river provided by this disclosure is as follows.

(1) A field for placing facilities is selected near a segment of a polluted and malodorous river to be treated, as an on-site field. The on-site field for mounting facilities is temporarily used and no permanent facilities are constructed, the field used will be recovered to the original function of use after the treatment of a polluted and malodorous river segment is finished.

(2) A container-type sand-stone refuse separation device (for example, a container-type grille), a container-type dehydration device, a container-type pulverization device, a container-type drying device, a container-type carbonization device, a container-type flocculation and precipitation device, a container-type activated coke filtration and adsorption device, a container-type power generation device, a container-type control and detection chamber, a container-type living facility, and the like are conveyed to the on-site field with a tow truck and placed thereon.

(3) A pneumatic-pump assembled-type water surface operation platform is conveyed to the on-site field with a tow truck, placed into the river with a crane, and assembled therein. A pneumatic pump is mounted onto the water surface operation platform. A sludge delivery pipe is laid on the water surface to the field for placing facilities.

(4) The river bed sludge is withdrawn with the pneumatic pump. The sludge is sequentially delivered to the container-type sand-stone refuse separation device, the container-type dehydration device, and the container-type drying device via delivery pipes on the surface of the river. The water content rate of the sludge is decreased from ≤95% to ≤40% by the dehydration device and the drying device.

(5) Biochar is produced from the dehydrated and dried sludge by using a carbonization method.

(6) Large-size matters discharged from the container-type sand-stone refuse separation device and the floating debris and river bank refuse are pulverized by the pulverization device. The pulverized large-size matters and the pulverized floating debris and river bank refuse are dehydrated and dried, and then form biochar by using a carbonization method.

(7) The biochar produced from the carbonized sludge, the large-size matters, and the floating debris and river bank refuse is delivered back to the river bed to adsorb ammonic nitrogen, phosphorus, and the like generated by degradation of organic matter in the river bed, thereby cleaning river water.

(8) Purification treatments of flocculation, precipitation, and activated coke filtration and adsorption are performed on sewage water discharged from the sludge dehydration device, and the purified sewage water is discharged back to the river.

(9) Circular purification treatments are performed on the polluted and malodorous river. The polluted and malodorous river water is withdrawn from one end of a river segment to be treated with a water pump, subjected to purification treatments of flocculation, precipitation, and activated coke filtration and adsorption, and discharged back into the river at the other end of the river segment after it reaches a water quality standard for river water specified by a local government. The water quality of the treated river segment is finally overall recovered to the river water quality standard specified by the local government.

The apparatus for implementing the method described above provided by this disclosure mainly comprise:

(1) a river bed sludge suction device;
(2) a container-type sand-stone refuse separation device, for example a container-type grille;
(3) a container-type dehydration device;
(4) a container-type pulverization device;
(5) a container-type storage bin;
(6) a container-type drying device;
(7) a container-type carbonization device;
(8) a container-type flocculation device;
(9) a container-type precipitation device;
(10) a container-type activated coke filtration and adsorption device;
(11) a container-type power generation device;
(12) a container-type control and detection chamber; and
(13) a cleaning ship for floating debris and river bank refuse.

The specific relationship of connection is as follows.

A container-type sand-stone refuse separation device, a container-type dehydration device, a container-type pulverization device, a container-type drying device, a container-type carbonization device, a container-type flocculation and precipitation device, a container-type activated coke filtration and adsorption device, a container-type power generation device, a container-type control and detection chamber, and the like are conveyed to the on-site field with a tow truck.

An assembled-type water surface operation platform is conveyed to the on-site field with a tow truck, placed into the river with a crane, and assembled therein. A pneumatic pump is mounted onto the water surface operation platform. A sludge delivery pipe is laid on the water surface to the field for placing facilities.

The river bed sludge is withdrawn with the pneumatic pump. The sludge is delivered to the container-type sand-stone refuse separation device, the container-type dehydration device, and the container-type drying device via delivery pipes on the surface of the river. The water content rate of the sludge is decreased from ≤95% to ≤40% by the dehydration device and the drying device.

Biochar is produced from the dehydrated sludge by using a carbonization method.

Floating debris and river bank refuse are cleared away and pulverized by the pulverization device. The pulverized floating debris and river bank refuse are dehydrated and dried, and then form biochar by using a carbonization method.

The biochars produced from the carbonized sludge, the large-size matters, and the floating debris and river bank refuse are delivered back to the river bed to adsorb ammonic nitrogen, phosphorus, and the like generated by degradation of organic matter in river bed, thereby cleaning river water.

Purification treatments of flocculation, precipitation, and activated coke filtration and adsorption are performed on sewage water discharged from the sludge dehydration device, and the purified sewage water is discharged back to the river.

Circular purification treatments are performed on the polluted and malodorous river. The polluted and malodorous river water is withdrawn from one end of a river segment to be treated with a water pump, subjected to purification treatments of flocculation, precipitation, and activated coke filtration and adsorption, and discharged back into the river at the other end of the river segment after it reaches a water quality standard for river water specified by a local government. The water quality of the treated river segment is finally overall recovered to the river water quality standard specified by the local government.

Detailed description will be made below in conjunction with accompanying drawings. It is to be indicated that various apparatuses shown in accompanying drawings are used as an Example, and specific arrangements thereof are not limited to the accompanying drawings only.

The pollution treatment of polluted and malodorous river water comprises: Withdrawing river bed sludge; dehydration and drying of the sludge; clearing away of floating debris and river bank refuse; pulverization of the floating debris and river bank refuse; dehydration and drying of the floating debris and river bank refuse; carbonization of the dehydrated and dried sludge; carbonization of the dehydrated and dried floating debris and river bank refuse; flocculation treatment of the river water and the sewage water; precipitation treatment of the river water and the sewage water; and circular purification treatments of filtration and adsorption of the river water and the sewage water.

FIG. 1 is referred to.

A field for placing facilities is selected near a segment 1 of a polluted and malodorous river to be treated, as an on-site field.

A sludge suction device 2 is conveyed to an on-site field with a tow truck, and the sludge suction device 2 is placed into the segment 1 of the polluted and malodorous river with a crane.

A sludge delivery pipe 3 is laid on the water surface of the segment 1 of the polluted and malodorous river to the field for placing facilities. The sludge suction device 2 is a well-known facility. The type of the sludge suction device 2 used in the present disclosure is not strictly limited. A relatively desirable facility can withdraw sludge from the river bed by using a pneumatic pump mounted on an assembled-type water surface operation platform in the case where the river water is minimally disturbed.

A cleaning ship 9 is conveyed to the on-site field with a tow truck, and the cleaning ship 9 is placed in the segment 1 of the polluted and malodorous river to be treated with a crane.

A container-type sand-stone refuse separation device 38, a container-type dehydration device 5, a storage container 6, a container-type drying device 37, a container-type carbonization device 7, a container-type pulverization device 11, a water pump 12, a container-type flocculation device 13, a container-type precipitation device 14, a container-type activated coke filtration and adsorption device 15, a delivery pipelines 16, sewage water 17, a container-type power generation device 18, a container-type operation and control chamber 19, a delivery facility A32, a delivery facility B33, a delivery facility C34, a delivery facility D35, a delivery facility E36, a delivery facility F40, and the like are conveyed to the on-site field with a tow truck and placed thereon.

The container-type sand-stone refuse separation device 38 is a sand-stone refuse separation device mounted in a container. The container and the sand-stone refuse separation device are both well-known facilities. The type of the sand-stone refuse separation device used as the container-type sand-stone refuse separation device 38 is not strictly limited in this disclosure, as long as it can be mounted in a container and can remove the large-size matters in sludge.

The container-type dehydration device 5 is a dehydration facility mounted in a container. The type of the dehydration facility used as the container-type dehydration device 5 is not strictly limited in this disclosure, as long as it can be mounted in a container and satisfy that the water content rate of sludge is decreased from ≤95% to ≤75%. A well-known centrifugal type dehydration facility or/and a press filtration type dehydration facility may be used. A relatively desirable facility is a press filtration type dehydration facility.

The container-type drying device 37 is a drying facility mounted on a platform container. The platform container and the drying facility are both well-known facilities. The type of the drying facility used as the container-type drying device 37 is not strictly limited in this disclosure, as long as it can be mounted on a platform container and satisfy that the water content rate of sludge is decreased from ≤75% to ≤40%. A well-known drum type drying machine may be used.

Figures 4, 5:
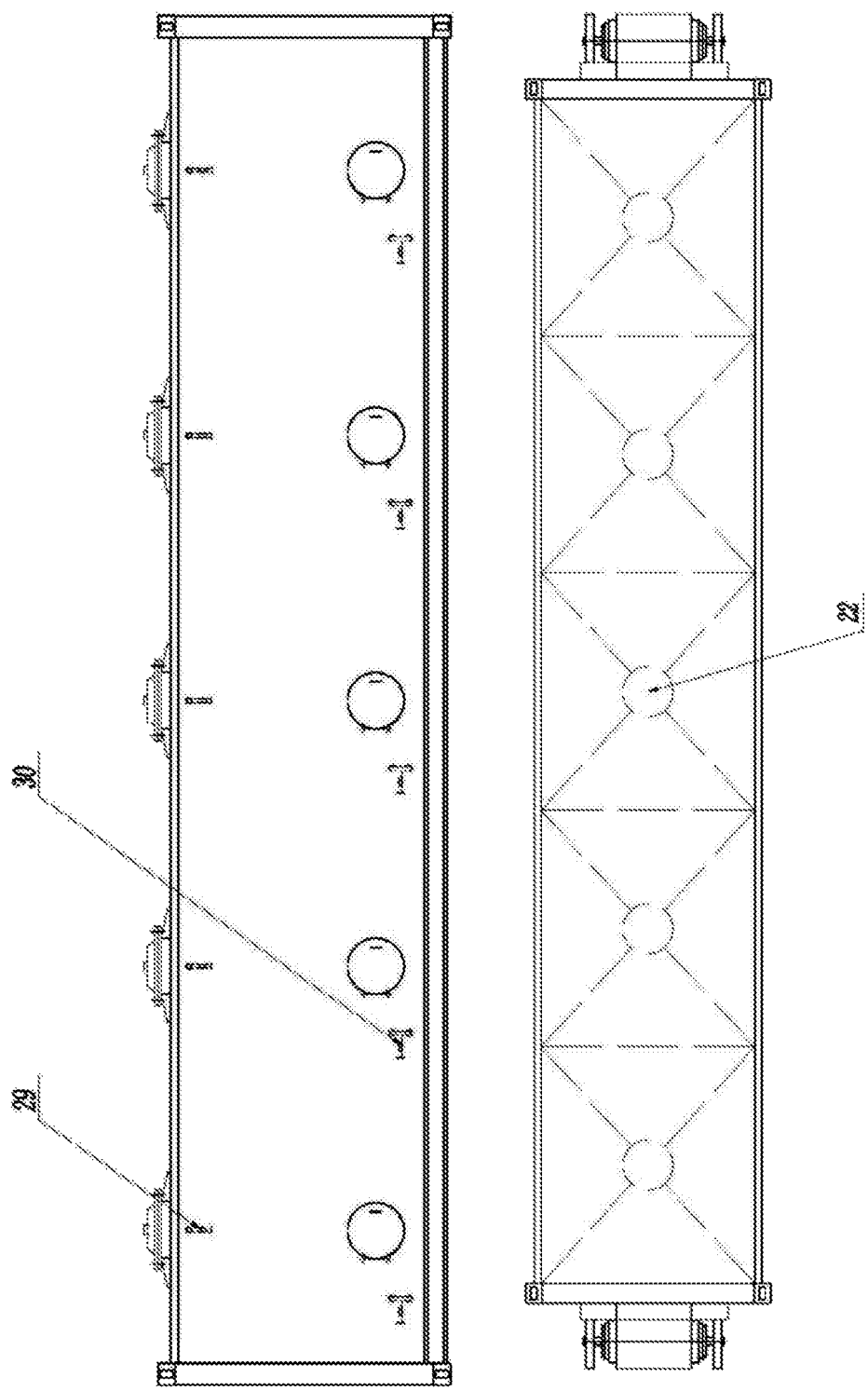
FIG. 4 is a side view of a container-type filtration and adsorption device.
FIG. 5 is a top view of a storage container.
Figure 6:
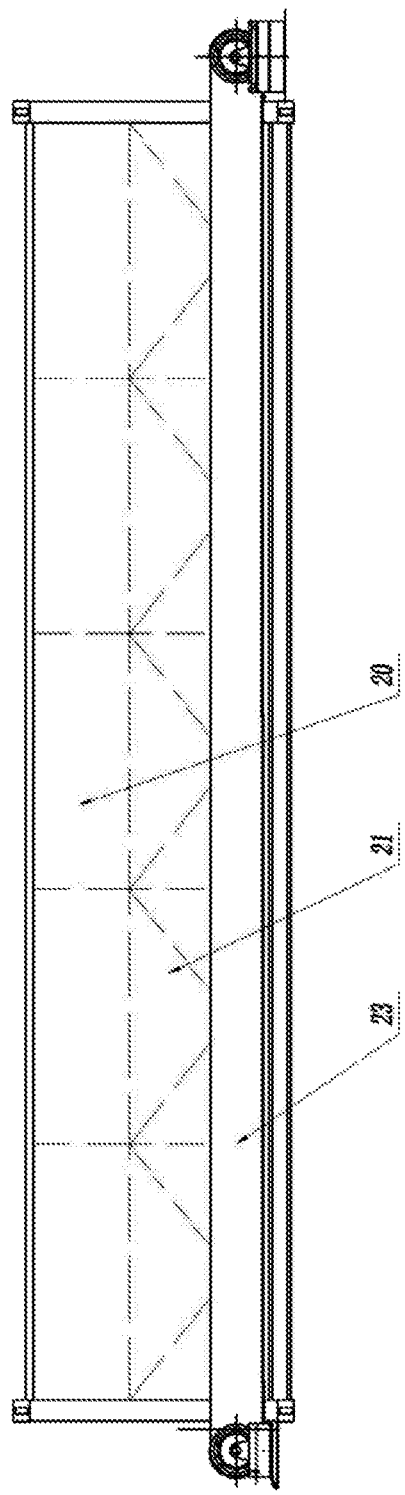
FIG. 6 is a side view of a storage container.
Figure 7:
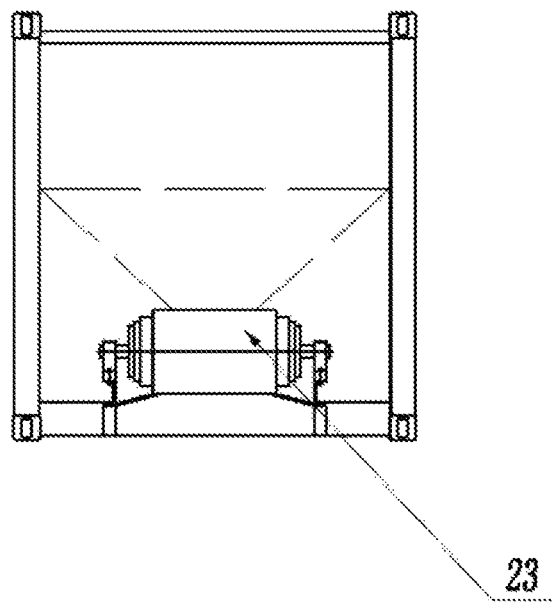
FIG. 7 is an end view of a storage container.

With reference to FIGS. 5-7, they are schematic diagrams of the storage container 6 of this disclosure. An open-top container is used as the storage container 6. A 40-foot container is used as the storage container 6 in this disclosure. The container is divided into six storage units 20. The lower part of each storage unit 20 is a unit conical body 21, a unit output port 22 is provided in the lower part of the unit conical body 21, and a belt conveyor 23 is mounted in the lower part of each unit output port 22.

The container-type carbonization device 7 is composed of two parts, which are a 40-foot container and a carbonization facility. The 40-foot container and the carbonization facility are both well-known facilities. The type of the facility used as the carbonization facility is not strictly limited in this disclosure, as long as it can satisfy the carbonization of sludge and floating debris and river bank refuse, for example the carbonization devices disclosed in Patent No. ZL200810135666.2 and ZL201010510277.0.

Figure 2:
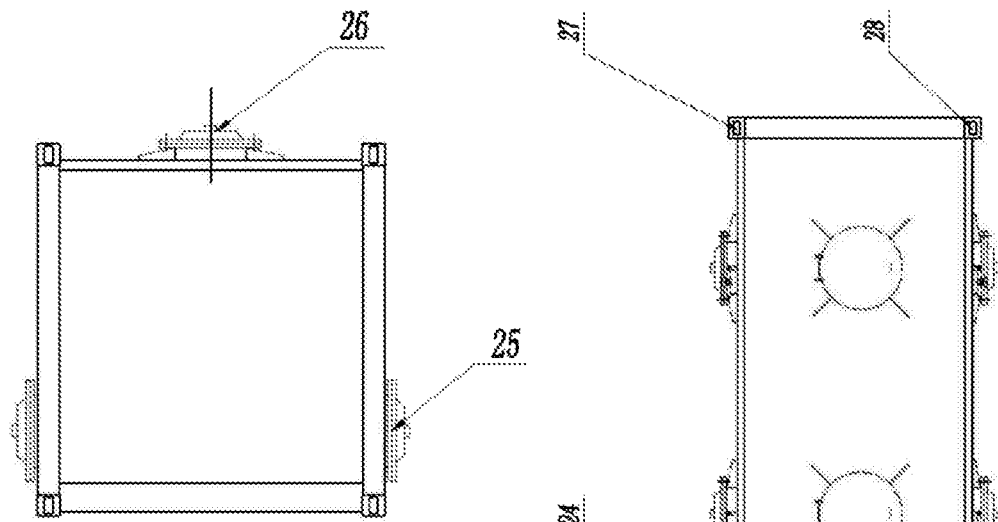
FIG. 2 is a schematic diagram of a container-type filtration and adsorption device.
Figure 3:
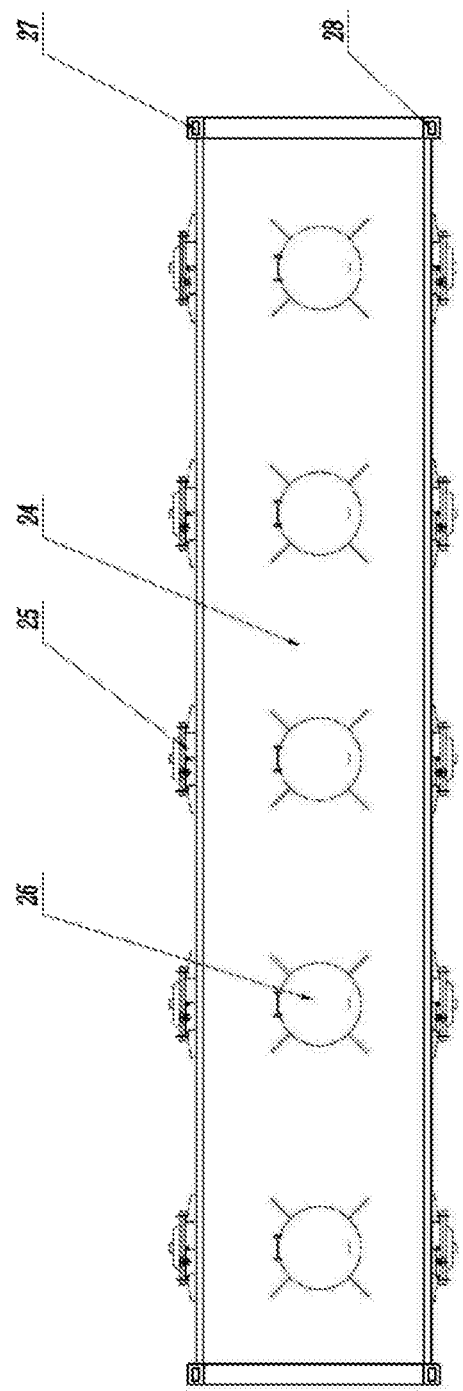
FIG. 3 is a top view of a container-type filtration and adsorption device.

With reference to FIGS. 2-4, they are schematic diagrams of the container-type activated coke filtration and adsorption device 15 of this disclosure. The container-type activated coke filtration and adsorption device 15 employs a standard size of a 20-foot container. A container body 24 is provided in the container-type activated coke filtration and adsorption device 15, a plurality of discharging ports 25, water outlet pipes 29, and water inlet pipes 30 are provided on a side surface of the container body 24, a plurality of charging ports 26 are provided on the top, lifting holes 27 are provided at four corners of the container body, locking holes 28 are provided at four bottom corners of the container body, and a filtration and adsorption material is filled inside.

The cleaning ship 9 is a well-known facility. The type of the ship used as the cleaning ship is not strictly limited in this disclosure, as long as it can clear away the floating debris and river bank refuse.

The container-type pulverization device 11 is composed of two parts, which are a 20-foot container and a pulverizing facility, and the pulverization facility is mounted on a platform container. The platform container and the pulverization facility are both well-known facilities. The type of the pulverization facility used in this disclosure is not strictly limited, as long as it can satisfy the pulverization of floating debris and river bank refuse.

The water pump 12 is a well-known facility. The type of the water pump used is not strictly limited in this disclosure, as long as it can deliver the river water to the container-type flocculation device 13.

The container-type flocculation device 13 is composed of two parts, which are a 40-foot container and a flocculation facility, and the flocculation facility is mounted in the container. The container and the flocculation facility are both well-known facilities. The type of the flocculation facility used in this disclosure is not strictly limited, as long as it can satisfy the flocculation treatments of the sewage water and the river water. A relatively desirable facility is a magnetic flocculation facility.

The container-type precipitation device 14 is composed of two parts, which are a 40-foot container and a precipitation facility, and the precipitation facility is mounted in the container. The container and the precipitation facility are both well-known facilities. The type of the precipitation facility used in this disclosure is not strictly limited, as long as it can satisfy the precipitation treatment of the sewage water and the river water after the flocculation treatment.

The container-type power generation device 18 is composed of two parts, which are a container and a diesel power generation facility, and the diesel power generation facility is mounted in the container. The container and the diesel power generation facility are all well-known facilities.

The container-type operation and control chamber 19 is composed of two parts, which are a container and an electrical control facility, and the electrical control facility is mounted in the container. The container and the electrical control facility are both well-known facilities.

The delivery facility A32, the delivery facility B33, the delivery facility C34, the delivery facility D35, the delivery facility E36, and the delivery facility F40 are all well-known facilities. The type of the delivery facility used in this disclosure is not strictly limited, as long as it can satisfy the delivery of materials. A well-known belt conveyor or/and a screw conveyor may be used.

The sludge suction device 2 withdraws the river bed sludge by using a pneumatic pump mounted in a water surface operation platform. The sludge containing large-size matters is delivered to the container-type sand-stone refuse separation device 38 by the sludge delivery pipe 3 laid on the surface of the river. The water content rate of the sludge 4 with large-size matters removed is decreased from ≤95% to ≤75% by the container-type dehydration device 5.

The dehydrated sludge 4 having a water content rate of ≤75% is delivered to the storage container 6 and stored therein via the delivery facility D35, delivered from the storage container 6 to the container-type drying device 37 via the delivery facility E36 to decrease the water content rate of the sludge 4 from ≤75% to ≤40%, and then passed into the container-type carbonization device 7 for carbonization to produce biochar.

Large-size matters 39 discharged from the container-type sand-stone refuse separation device 38 are delivered to the container-type pulverization device 11 for pulverization via the delivery facility F40. The pulverized large-size matters 39 are delivered to the container-type dehydration device 5 for dehydration via the delivery facility B33. The dehydrated large-size matters 39 are delivered to the storage container 6 and stored therein via the delivery facility C34, delivered from the storage container 6 to the container-type drying device 37 via the delivery facility E36 to decrease the water content rate of the sludge 4 from ≤75% to ≤40%, and then passed into the container-type carbonization device 7 for carbonization to produce biochar.

Floating debris and river bank refuse 10 are cleared away by the cleaning ship 9. The resulted floating debris and river bank refuse 10 are delivered to the container-type pulverization device 11 for pulverization via the delivery facility A32. The pulverized floating debris and river bank refuse 10 are delivered to the container-type dehydration device 5 for dehydration via the delivery facility B33. The dehydrated floating debris and river bank refuse 10 are delivered to the storage container 6 and stored therein via the delivery facility C34, delivered from the storage container 6 to the container-type drying device 37 via the delivery facility E36 to decrease the water content rate of the sludge 4 from ≤75% to ≤40%, and then passed into the container-type carbonization device 7 for carbonization to produce biochar.

The biochars 8 produced from the carbonized sludge 4 and the floating debris and river bank refuse 10 are delivered back to the river bed of the segment 1 of the polluted and malodorous river to be treated to adsorb ammonic nitrogen, phosphorus, and the like generated by degradation of organic matter in the river bed, and thereby cleaning river water.

The sewage water 17 discharged from the container-type dehydration device 5 is delivered to the container-type flocculation device 13 for flocculation treatment.

The sewage water 17 after flocculation treatment is delivered to the container-type precipitation device 14 for precipitation treatment, and then delivered to the container-type activated coke filtration and adsorption device 15 for purification treatment of filtration and adsorption, and then discharged back to the river.

Polluted and malodorous river water is withdrawn from one end of a segment 1 of a polluted and malodorous river to be treated with a water pump 12, and delivered to the container-type flocculation device 13 for flocculation treatment via the delivery pipelines 16A. The polluted and malodorous river water after flocculation treatment is delivered to the container-type precipitation device 14 for precipitation treatment. It is delivered to the container-type activated coke filtration and adsorption device 15 for purification treatment of filtration and adsorption, and then discharged back to the river at the other end of the river segment via the delivery pipelines 16B after a water quality standard for river water specified by a local government, i.e., the water quality standard for type III surface water in "Environmental quality standards for surface water" GB3838-2002, is reached. After several cycles of purification treatments, the water quality of the treated segment 1 of the polluted and malodorous river is finally overall recovered to the river water quality standard specified by the local government, i.e., the water quality standard for type III surface water in "Environmental quality standards for surface water" GB3838-2002.

This disclosure can treat the pollution of polluted and malodorous rivers, improve the self-cleaning capacity of river water, and recover the ecological balance of rivers and ambient environments thereof.

What is claimed is:

1. A process of treating a polluted and malodorous river, comprising:
   1) withdrawing a sludge from a river bed, and separating, dehydrating, and drying the sludge;
   2) producing biochar from the separated, dehydrated, and dried sludge;
   3) clearing away and pulverizing floating debris and river bank refuse, dehydrating and drying the pulverized floating debris and river bank refuse, and then producing biochar from them;
   4) delivering the biochars produced in steps 2) and 3) back to the river bed to adsorb ammonic nitrogen form and phosphorus generated by degradation of organic matter in the river bed, thereby cleaning river water;
   5) performing purification treatments of flocculation, precipitation, and activated coke filtration and adsorption on sewage water discharged by the dehydration in step 2) and 3), and discharging the purified sewage water back to the river; and 6) withdrawing water from one end of a river segment to be treated with a water pump, sequentially passing the water into a container-type flocculation device, a container-type precipitation device, and a container-type activated coke filtration and adsorption device for performing purification treatments of flocculation, precipitation, and activated coke filtration and adsorption, and discharging the treated water back into the river at the other end of the river segment after it reaches a water quality standard.

2. The process according to claim 1, wherein in step 1, a water content rate of the sludge is decreased from ≤95% to ≤40%.

3. The process according to claim 1, wherein in step 2 and step 3, biochar is produced by using a carbonization method.

4. The process according to claim 1, wherein in step 6, polluted and malodorous river water is withdrawn from said one end of the river segment to perform purification treatments of flocculation, precipitation, and activated coke filtration and adsorption, and the treated water is discharged back into the river at said other end of the river segment, so as to perform a circular purification treatment.

5. An apparatus intended for use in carrying out the process of claim 1, comprising:
   a sludge suction device placed into the segment of the polluted and malodorous river, for withdrawing the river bed sludge from the river segment,
   a container-type sand-stone refuse separation device for removing large-size matters in sludge,
   a container-type dehydration device for reducing water content of the sludge,
   a container-type pulverization device for treating the large-size matters,
   a container-type drying device for drying the dehydrated sludge,
   a container-type carbonization device for producing biochar,
   a container-type flocculation device for performing purification treatments by flocculation,
   a container-type precipitation device for performing purification treatments by precipitation,
   a container-type activated coke filtration and adsorption device for performing purification treatments by activated coke filtration and adsorption,
   a container-type power generation device for providing working power, and
   a container-type operation and control chamber for controlling operations of the devices described above,
   wherein the sludge suction device is connected to the container-type sand-stone refuse separation device via a sludge delivery pipe laid on a water surface, the sludge treated by the container-type sand-stone refuse separation device is passed into the container-type dehydration device, large-size matters discharged from the container-type sand-stone refuse separation device is delivered to the container-type pulverization device for treatment and then passed into the container-type dehydration device for dehydration, sewage water discharged from the container-type dehydration device is sequentially passed into the container-type flocculation device, the container-type precipitation device, and the container-type activated coke filtration and adsorption device for performing purification treatments of flocculation, precipitation, and activated coke filtration and adsorption and then discharged back to the river, the sludge dehydrated by the container-type dehydration device is passed into the container-type drying device for treatment, and the sludge treated by the container-type drying device is delivered to the container-type carbonization device for producing biochar;
   wherein floating debris or/and river bank refuse collected by a cleaning ship are delivered to the container-type pulverization device for pulverization and then passed into the container-type dehydration device for dehydration, a residue after dehydration is passed into the container-type drying device for treatment, the residue treated by the container-type drying device is delivered to the container-type carbonization device for producing biochar, and the sewage water discharged from the container-type dehydration device is sequentially passed into the container-type flocculation device, the container-type precipitation device, and the container-type activated coke filtration and adsorption device for performing purification treatments of flocculation, precipitation, and activated coke filtration and adsorption and then discharged back to the river; and
   wherein polluted and malodorous river is withdrawn from one end of a river segment to be treated with a water pump, sequentially passed the water into the container-type flocculation device, the container-type precipitation device, and the container-type activated coke filtration and adsorption device for performing purification treatments of flocculation, precipitation, and activated coke filtration and adsorption, and discharged back into the river at the other end of the river segment.

6. The apparatus according to claim 5, wherein delivery facilities and storage containers are provided among the container-type sand-stone refuse separation device, the container-type dehydration device, the container-type drying device, and the container-type carbonization device.

7. The apparatus according to claim 6, wherein the storage container is an open-top container and the storage container is divided into a plurality of storage units, and the lower part of each storage unit is a unit conical body, a unit output port is provided in the lower part of the unit conical body, and a belt conveyor is mounted in the lower part of each unit output port.

8. The apparatus according to claim 5, wherein a container body is provided in the container-type activated coke filtration and adsorption device, a plurality of discharging ports, water outlet pipes, and water inlet pipes are provided on a side surface of the container body, a plurality of charging ports are provided on the top of the container body, lifting holes are provided at four top corners of the container body of the container body, locking holes are provided at four bottom corners of the container body, and an activated coke filtration and adsorption material is filled in the container body.

9. The apparatus according to claim 5, wherein the container-type power generation device is composed of two parts, which are a container and a diesel power generation facility, and the diesel power generation facility is mounted in the container.

10. The apparatus according to claim 5, wherein the container-type operation and control chamber is composed of two parts, which are a container and an electrical control facility, and wherein the electrical control facility is mounted in the container.

* * * * *